United States Patent [19]

Christenson et al.

[11] Patent Number: 5,058,381
[45] Date of Patent: Oct. 22, 1991

[54] LOW RESTRICTION EXHAUST TREATMENT APPARATUS

[75] Inventors: Barry O. Christenson, Fargo, N. Dak.; Albert H. Mayfield, Lennon, Mich.

[73] Assignee: General Motors Corporation, Detroit, Mich.

[21] Appl. No.: 469,613

[22] Filed: Jan. 24, 1990

[51] Int. Cl.$^5$ ............................ F01N 3/02; F01N 3/28
[52] U.S. Cl. ........................................ 60/299; 55/418; 55/DIG. 30; 60/311; 181/243; 181/264; 181/269; 422/176
[58] Field of Search ................... 60/299, 311; 422/176, 422/180; 181/243, 264, 269; 55/DIG. 30, 418, 566

[56] References Cited

U.S. PATENT DOCUMENTS 3,749,130  7/1973  Howitt .................................. 422/176
4,209,495  6/1980  Kobayashi .......................... 422/176

Primary Examiner—Douglas Hart
Attorney, Agent, or Firm—Karl F. Barr, Jr.

[57] ABSTRACT

A low restriction exhaust treatment apparatus having a hollow outer shell into which a means for treating exhaust gas emitted from an internal combustion engine is disposed, end portions disposed at each end of the outer shell to sealingly close the inner portion of the shell, and end tubes inserted into apertures formed in the sealing end portions for facilitating exhaust flow into and out of the apparatus. The end tubes each have a plurality of axially extending, radially inwardly angled serrations formed about one end thereof to form a lead-in portion of a reduced diameter for ease of insertion of the tubes into the apertures of the end portions without creation of undesirable exhaust system back pressure.

5 Claims, 1 Drawing Sheet

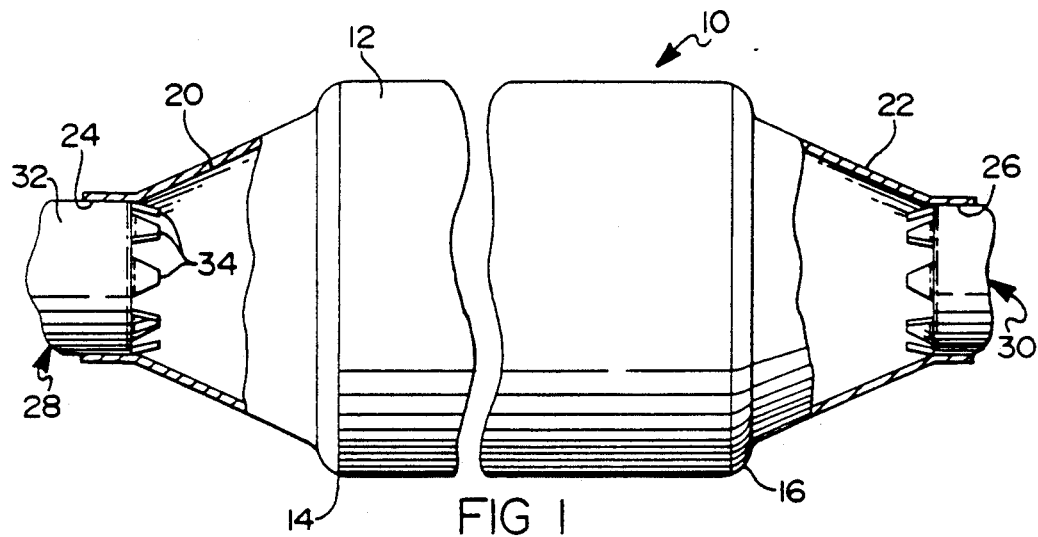
FIG 1
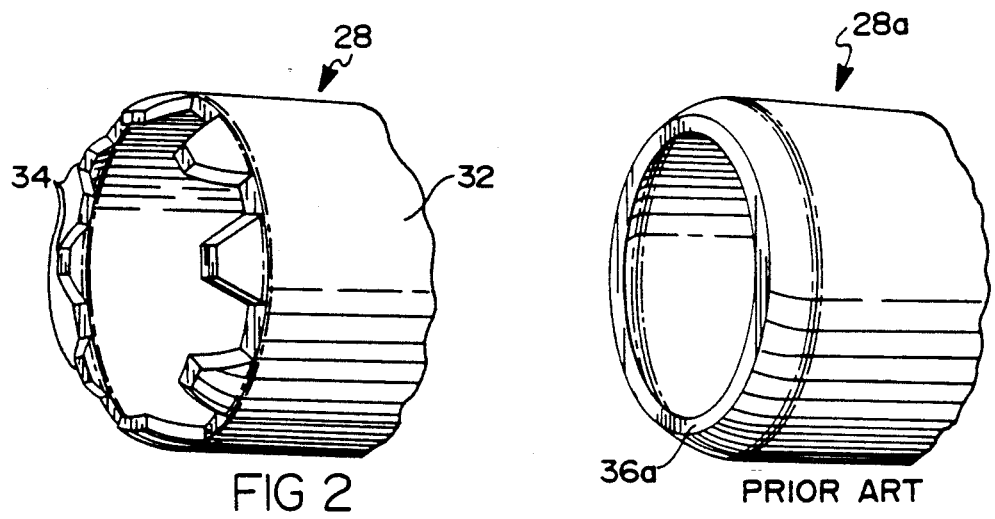
FIG 2
PRIOR ART
FIG 4
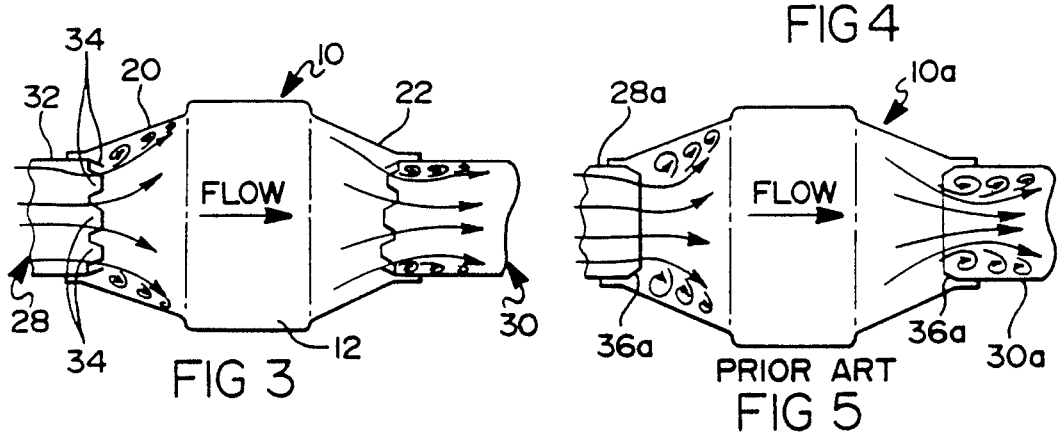
FIG 3
PRIOR ART
FIG 5

LOW RESTRICTION EXHAUST TREATMENT APPARATUS

BACKGROUND OF THE INVENTION

1. Field of the Invention

The present invention relates to an exhaust treatment apparatus, such as a catalytic converter or the like, having a low restriction end tube useful for reducing back pressure in the exhaust system of an internal combustion engine.

2. Description of the Relevant Art

Typical automotive vehicle exhaust systems incorporate a catalytic converter and at least one muffler or other noise attenuator. Many of these devices have similar external housings which have conical or truncated end portions, see FIG. 5, that necessitate the insertion of end tubes 28a and 30a through apertures formed therein. The end tubes allow the devices to be easily assembled to the exhaust system of an automobile by axial sliding engagement therewith.

In order to facilitate the insertion of the end tubes into the end portions of the converters or mufflers, the tubes 28a often have a taper 36a, see FIG. 4, at the insertion end thereof. The taper 36a reduces the end diameter of the tube to provide a lead-in radius for guiding the tubes into the end portion of the device 10a. While the tapered end tubes 28a and 30a greatly simplify assembly, the end result is a marked increase in overall exhaust system back pressure. The taper increases the severity of flow separation at the inlet to the shell and in the outlet tube itself, as shown in FIG. 5, leading to a reduction in exhaust system efficiency. Such increases in system back pressure are undesirable from the standpoint of system efficiency.

SUMMARY OF THE INVENTION

In accordance with the present invention, a low restriction exhaust treatment apparatus for use in the exhaust system of an internal combustion engine is disclosed. The apparatus comprises a hollow outer shell, into which exhaust treatment means are inserted, having end portions which sealingly close the ends of the shell. The end portions have apertures formed therein to facilitate the insertion of end tubes which are useful for attachment of the exhaust treatment apparatus to the exhaust system of the engine.

To simplify insertion of the end tubes into the apertures formed in the end portions, each end tube has a plurality of serrations formed about the circumference of one end. The serrations extend axially inwardly and are angled radially inwardly with the tip portions of the serrations forming a lead-in portion having a reduced diameter.

During assembly the lead-in portion acts in a manner similar to the tapered end portion typically used. However, in operation, the serrations provide greatly reduced flow restriction and an increase in flow uniformity. The result is an increase in exhaust system efficiency.

Other objects and features of the invention will become apparent by reference to the following description and to the drawings.

BRIEF DESCRIPTION OF THE DRAWINGS

FIG. 1 is a side view, partially in section, of a low restriction exhaust treatment apparatus embodying the present invention;

FIG. 2 is a perspective view of an exhaust treatment apparatus end tube embodying the present invention;

FIG. 3 is a schematic side view of a catalytic converter embodying the present invention showing gas flow characteristics therein;

FIG. 4 is a perspective view of a prior art exhaust apparatus end tube;

FIG. 5 is a schematic side view of a prior art catalytic converter showing gas flow characteristics therein.

DESCRIPTION OF THE PREFERRED EMBODIMENT

In FIGS. 1–3 there is shown an exhaust treatment apparatus, designated generally as 10, useful for treating exhaust gas from an internal combustion engine prior to its release to the atmosphere. The apparatus 10 has an axially extending, cylindrical outer shell 12 having first and second ends 14 and 16, respectively. Additional outer shell configurations such as oval, square, rectangular, or other shapes are also applicable, and depend on the particular application of the apparatus 10. Outer shell 12 is constructed of stainless steel or other suitable material having a high degree of durability under varying operating conditions.

Exhaust treatment means are disposed within the outer shell 12 and, depending on the particular application, act to modify various undesirable characteristics of the engine exhaust passing therethrough. For example, a monolithic catalyst substrate or a particulate trap (not shown) may be used to minimize undesirable exhaust emissions within the exhaust gas. Alternately, a noise attenuating apparatus such as a series of baffles (not shown) may be used for reduction or modification of undesirable exhaust system noise. Mounting of the exhaust treatment means is by any suitable method known in the art.

First and second end portions 20 and 22 sealingly close first and second ends 14 and 16 of outer shell 12, respectively. End portions 20 and 22 may be conical in shape, as shown in FIG. 1, or may have any other suitable configuration dependent upon the particular application of the exhaust treatment apparatus 10, and are constructed of material similar to that of outer shell 12.

Inlet and outlet apertures 24 and 26 are formed in first and second end portions 20 and 22 to facilitate flow of exhaust gas into and out of the apparatus. In order to provide ease in assembly of the exhaust treatment apparatus 10 to the exhaust system of the engine, end tubes 28 and 30 are provided, which sealingly engage apertures 24 and 26, respectively. Both end tubes are similar in configuration and, therefore, only end tube 28 will be subsequently described.

End tube 28 comprises an axially extending hollow conduit 32, see FIG. 2, having a plurality of axially inwardly extending serrations 34 disposed about the perimeter of one end thereof. The serrated portions 34 are angled radially inwardly, see FIG. 1, to form a lead-in portion having a reduced diameter at the end to simplify insertion of that end of pipe 28 into the aperture 24 of end portion 20. The serrated portions 34 act to encourage flow uniformity of the exhaust gas flowing through the end pipe 28 while minimizing increase in exhaust system back pressure produced by the lead-in portion. As illustrated in FIG. 3, flow separation at both the entrance and exit of the exhaust treatment apparatus 10 is minimal with the application of end tubes 28 and 30, as compared to the prior art exhaust treatment apparatus 10a, see FIG. 5, in which conventional tapered end tubes 28a and 30a are used.

The following test results exemplify the difference in operating characteristics of an exhaust treatment apparatus having end tubes embodying the present invention as compared with an exhaust treatment apparatus in which conventional tapered end tubes are used.

|  | PRESSURE | | |
| --- | --- | --- | --- |
|  | 100 CFM | 200 CFM | 300 CFM |
| Standard Inlet | 3.2 | 10.2 | 21.8 |
| Modified Inlet | 2.9 | 8.7 | 17.9 |

Pressure was measured on a test stand on which the inlet tube is opened to atmospheric and the outlet tube, having a straight pipe configuration is attached to a suction source. Pressure was measured as the difference between atmospheric and pressure at the outlet fitting in inches of water. The flow through the apparatus was measured in cubic feet per minute.

Since the amount of exhaust system back pressure caused by such an obstruction is a function of the percentage tube blockage, the present invention achieves its greatest effectiveness when applied to smaller diameter tubes. These types of tubes are typically those used in conjunction with small engines where efficiency is a key factor.

The exhaust treatment apparatus of the present invention is an efficient solution to undesirable exhaust system back pressure found with conventional tapered-end end tubes. It is simple in construction, easy to manufacture, and may be used with current exhaust systems.

Furthermore, greater efficiency is achieved when applied to small diameter exhaust systems where efficiency and economy are important factors.

While one embodiment of the invention has been described in detail above in relation to a low restriction exhaust treatment apparatus, it will be apparent to those skilled in the art that the disclosed embodiment may be modified. Therefore, the foregoing description is to be considered exemplary, rather than limiting, and the true scope of the invention is that described in the following claims.

The embodiments of the invention in which an exclusive property or privilege is claimed are defined as follows:

1. An end tube for use in an exhaust treatment apparatus of an exhaust system for an internal combustion engine comprising:
   an axially extending, hollow conduit having first and second ends;
   a plurality of axially inwardly extending serrations disposed about the circumference of said first end, said serrated portions angled radially inwardly to form a lead-in portion of a reduced diameter thereabout;
   said inwardly tapered serrated portion facilitating insertion of said end tube into the exhaust treatment apparatus without an undesirable increase in exhaust system back pressure.

2. An exhaust treatment apparatus for use in the exhaust system of an internal combustion engine comprising:
   an outer shell having first and second open ends and a hollow central portion;
   exhaust treatment means disposed within said hollow central portion;
   end portions configured to sealingly close said first and second open ends, respectively, having an aperture formed in each of said end portions to facilitate flow of exhaust gas into and out of said central portion;
   an end tube, having a cross-section corresponding to one of said apertures, sealingly engaged within said aperture;
   said end tube further comprising a plurality of axially inwardly extending serrations disposed about the perimeter of one end, said serrated portions angled radially inwardly to form a lead-in radius portion of a reduced diameter thereabout, said inwardly tapered, serrated portion facilitating insertion of said end tube into the exhaust treatment apparatus without an undesirable increase in exhaust system back pressure.

3. An exhaust treatment apparatus as described in claim 2, said exhaust treatment means comprising a monolithic catalyst substrate for treatment of undesirable exhaust emissions within the exhaust gas.

4. An exhaust treatment apparatus as described in claim 2, said exhaust treatment means comprising sound attenuating means for reducing undesirable noise emissions.

5. An exhaust treatment apparatus as described in claim 2, said exhaust treatment means comprising a particulate trap for minimization of undesirable exhaust emissions within the exhaust gas.

* * * * *